(12) United States Patent
Kamio et al.

(10) Patent No.: US 11,410,337 B2
(45) Date of Patent: Aug. 9, 2022

(54) IMAGE PROCESSING DEVICE, IMAGE PROCESSING METHOD AND MOBILE BODY

(71) Applicant: SONY CORPORATION, Tokyo (JP)

(72) Inventors: Kazunori Kamio, Kanagawa (JP); Toshiyuki Sasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 20 days.

(21) Appl. No.: 17/040,525

(22) PCT Filed: Dec. 27, 2018

(86) PCT No.: PCT/JP2018/048105
§ 371 (c)(1),
(2) Date: Sep. 22, 2020

(87) PCT Pub. No.: WO2019/187446
PCT Pub. Date: Oct. 3, 2019

(65) Prior Publication Data
US 2021/0004990 A1   Jan. 7, 2021

(30) Foreign Application Priority Data

Mar. 30, 2018   (JP) .............................. JP2018-068240

(51) Int. Cl.
*G06K 9/00* (2022.01)
*G06T 7/90* (2017.01)
(Continued)

(52) U.S. Cl.
CPC .................. *G06T 7/90* (2017.01); *B60Q 1/04* (2013.01); *G06T 7/0004* (2013.01); *G06T 2207/10048* (2013.01); *G06T 2207/20024* (2013.01)

(58) Field of Classification Search
None
See application file for complete search history.

(56) References Cited

U.S. PATENT DOCUMENTS

| | | | |
|---|---|---|---|
| 2016/0173790 A1* | 6/2016 | Ishihara | H04N 5/332 348/164 |
| 2018/0054573 A1* | 2/2018 | Handley | G01J 5/0859 |

(Continued)

FOREIGN PATENT DOCUMENTS

| | | |
|---|---|---|
| CN | 105453532 A | 3/2016 |
| CN | 107534761 A | 1/2018 |

(Continued)

OTHER PUBLICATIONS

International Search Report and Written Opinion of PCT Application No. PCT/JP2018/048105, dated Feb. 26, 2019, 07 pages of ISRWO.

*Primary Examiner* — Sean M Conner
(74) *Attorney, Agent, or Firm* — Chip Law Group

(57) ABSTRACT

There is provided an image processing device to which a visible light image and an infrared ray image are input, the visible light image having been obtained corresponding to irradiation of a visible light in a second direction, the infrared ray image having been obtained corresponding to irradiation of an infrared ray in a first direction, which is a direction having an irradiation range larger than an irradiation range of the second direction, and which synthesizes the infrared ray image and the visible light image to generate a color image.

7 Claims, 13 Drawing Sheets

(51) Int. Cl.
*B60Q 1/04* (2006.01)
*G06T 7/00* (2017.01)

(56) References Cited

U.S. PATENT DOCUMENTS

| | | | |
|---|---|---|---|
| 2018/0115752 A1 | 4/2018 | Sato | |
| 2019/0318463 A1* | 10/2019 | Zhang | G06T 5/002 |
| 2020/0357104 A1* | 11/2020 | Luo | G06T 7/40 |
| 2021/0014430 A1* | 1/2021 | Weng | H04N 5/247 |

FOREIGN PATENT DOCUMENTS

| | | |
|---|---|---|
| JP | 2011-155390 A | 8/2011 |
| JP | 2016-213628 A | 12/2016 |
| WO | 2015/015580 A1 | 2/2015 |
| WO | 2016/178379 A1 | 11/2016 |

* cited by examiner

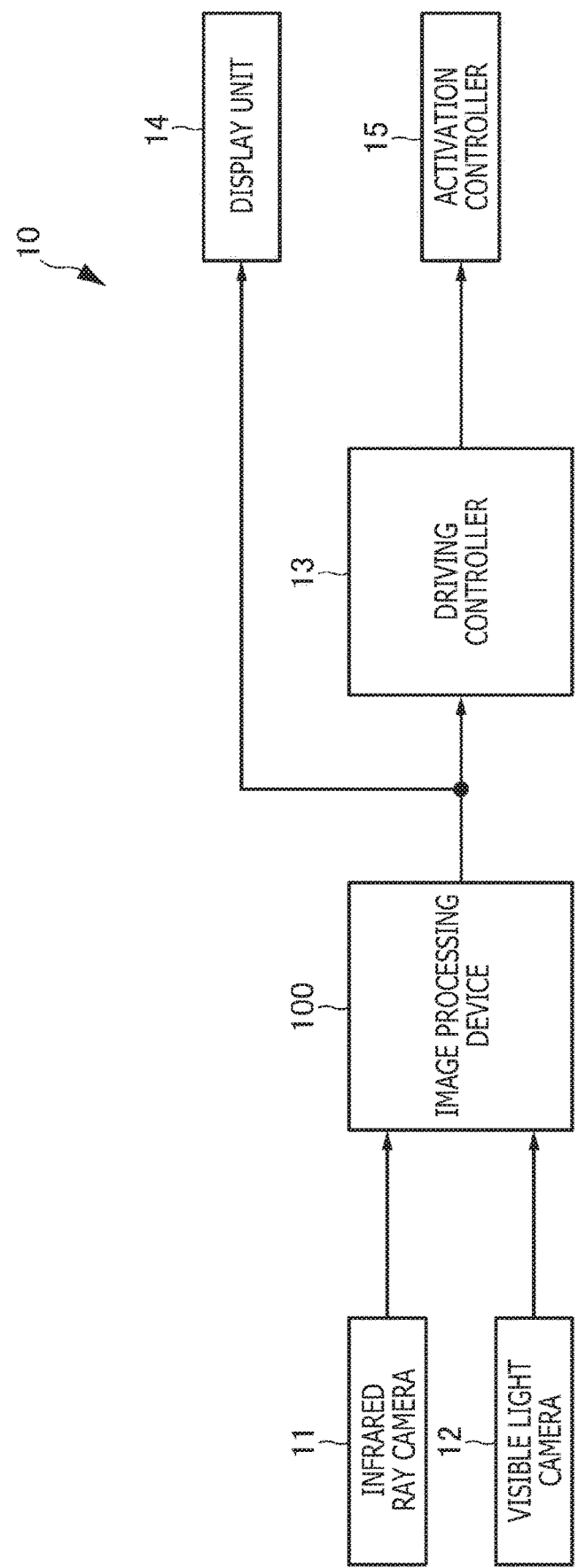

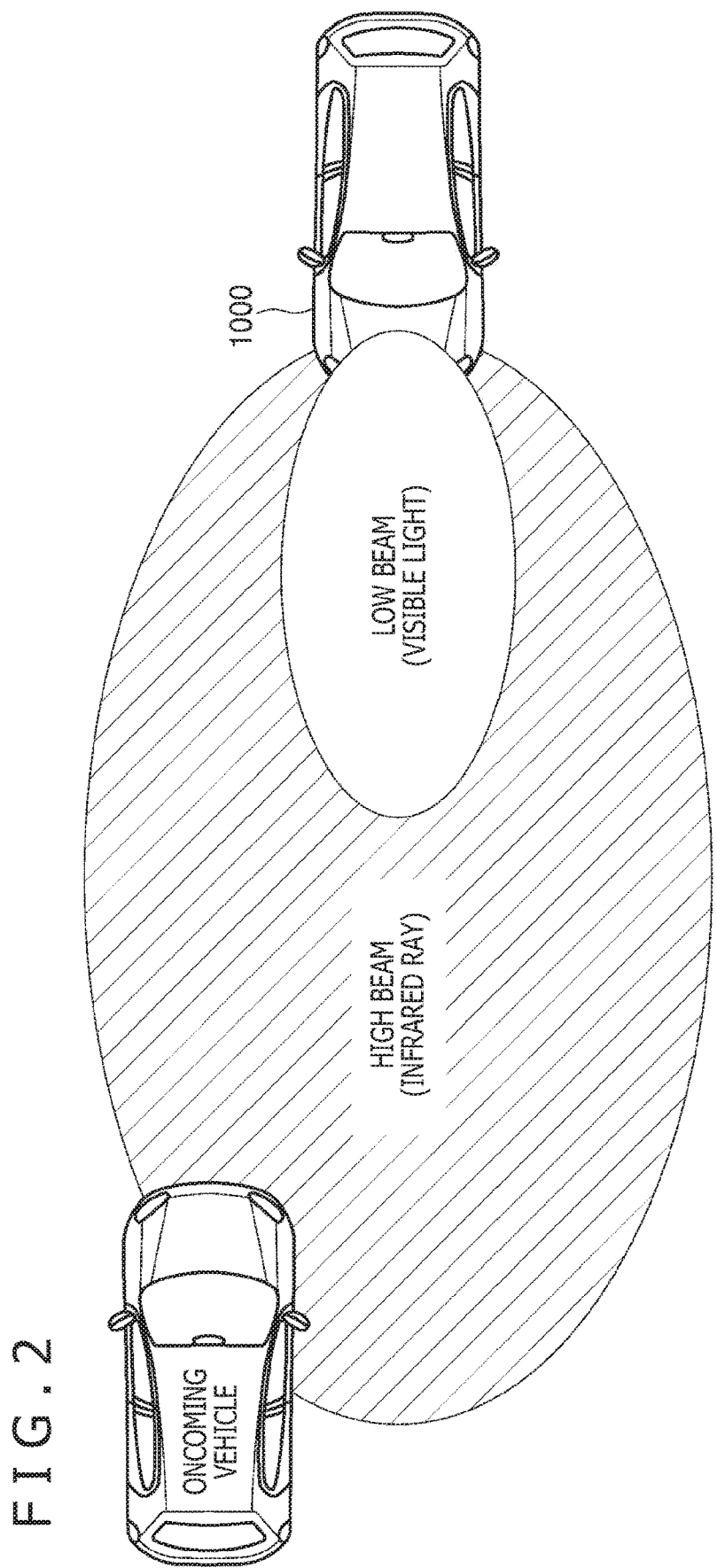

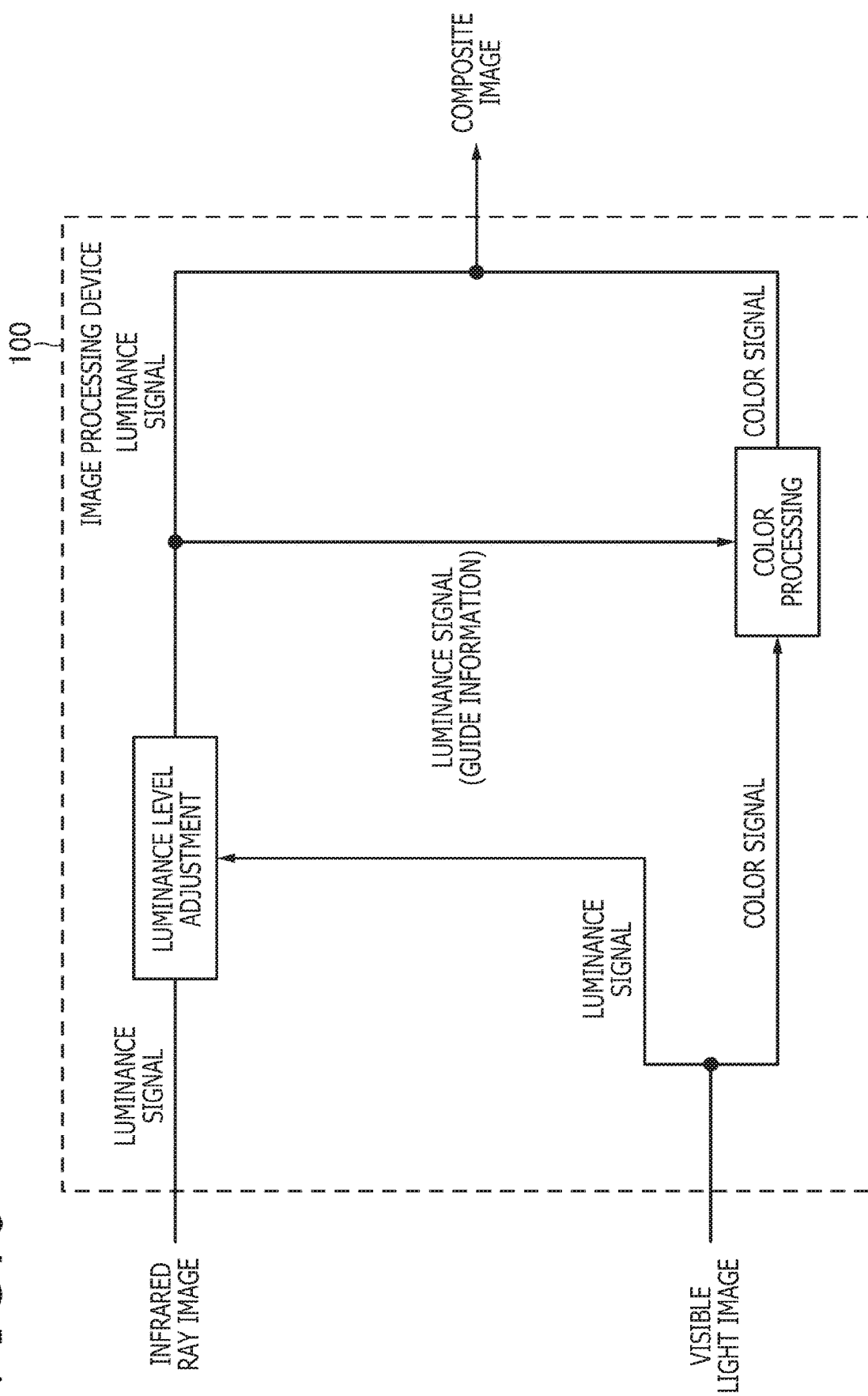

INFRARED RAY IMAGE

VISIBLE LIGHT IMAGE

COMPOSITE IMAGE

F I G . 1 2

| | VISIBILITY IN VICINITY | VISIBILITY OF DISTANT PLACE | VISIBILITY IN PERIPHERY | COLOR IMAGE | DISPLAY | APPLICATION TO ADAS |
|---|---|---|---|---|---|---|
| LOW BEAM (VISIBLE LIGHT) | ◯ | ✕ | ✕ | ✕ | ✕ | ✕ |
| ADAPTIVE HEADLIGHT | ◯ | △ | △ | △ | △ | △ |
| NEAR INFRARED IMAGE | ◯ | ◯ | ◯ | ✕ | △ | △ |
| COMPOSITE IMAGE OF PRESENT TECHNOLOGY | ◯ | ◯ | ◯ | ◯ | ◯ | ◯ |

IMAGE PROCESSING DEVICE, IMAGE PROCESSING METHOD AND MOBILE BODY

CROSS REFERENCE TO RELATED APPLICATIONS

This application is a U.S. National Phase of International Patent Application No. PCT/JP2018/048105 filed on Dec. 27, 2018, which claims priority benefit of Japanese Patent Application No. JP 2018-068240 filed in the Japan Patent Office on Mar. 30, 2018. Each of the above-referenced applications is hereby incorporated herein by reference in its entirety.

TECHNICAL FIELD

The present technology relates to an image processing device, an image processing method, an image processing program, and a mobile body.

BACKGROUND ART

In the past, a technology has been proposed for presenting scenes of a field of vision with good visibility during driving to a driver who is driving a vehicle (hereinafter, referred to as a user) (PTL 1).

CITATION LIST

Patent Literature

[PTL 1]
Japanese Patent Laid-Open No. 2011-155390

SUMMARY

Technical Problem

Headlights of an automobile usually include lights having different irradiation directions and different irradiation ranges, which are referred to as a high beam and a low beam. The range that a user can visually recognize is different depending on which light is irradiated, and there is a difference in color or presence or absence of noise also in an image obtained by photographing a field of vision during driving. Hence, there is an issue that a high-quality image obtained by photographing the field of vision while the user is driving cannot be presented.

The present technology has been made in view of the above issue and has an object to provide an image processing device, an image processing method, an image processing program, and a mobile body, which are capable of generating a color image from respective images obtained corresponding to a visible light and an infrared ray that are irradiated in different directions.

Solution to Problem

To solve the above-described issue, a first technology is an image processing device to which a visible light image and an infrared ray image are input, the visible light image having been obtained corresponding to irradiation of a visible light in a second direction, the infrared ray image having been obtained corresponding to irradiation of an infrared ray in a first direction, which is a direction having an irradiation range larger than an irradiation range of the second direction, and which synthesizes the infrared ray image and the visible light image to generate a color image.

Further, a second technology is an image processing method including receiving inputs of a visible light image and an infrared ray image, the visible light image having been obtained corresponding to irradiation of a visible light in a second direction, the infrared ray image having been obtained corresponding to irradiation of an infrared ray in a first direction, which is a direction having an irradiation range larger than an irradiation range of the second direction, and synthesizing the infrared ray image and the visible light image to generate a color image.

Further, a third technology is an image processing program for causing a computer to perform an image processing method including receiving inputs of a visible light image and an infrared ray image, the visible light image having been obtained corresponding to irradiation of a visible light in a second direction, the infrared ray image having been obtained corresponding to irradiation of an infrared ray in a first direction, which is a direction having an irradiation range larger than an irradiation range of the second direction, and synthesizing the infrared ray image and the visible light image to generate a color image.

Furthermore, a fourth technology is a mobile body including an image processing device and an illumination device, the image processing device to which a visible light image and an infrared ray image are input, the visible light image having been obtained corresponding to irradiation of a visible light in a second direction, the infrared ray image having been obtained corresponding to irradiation of an infrared ray in a first direction, which is a direction having an irradiation range larger than an irradiation range of the second direction, and which synthesizes the infrared ray image and the visible light image to generate a color image, and the illumination device that irradiates an infrared ray in the first direction and that irradiates a visible light in the second direction.

Advantageous Effect of Invention

According to the present technology, a color image can be generated from respective images obtained corresponding to a visible light and an infrared ray that have been irradiated in different directions. It should be noted that the present technology is not necessarily limited to the effects described here, and any effects described herein may be applicable.

BRIEF DESCRIPTION OF DRAWING

FIG. 1 is a block diagram illustrating a configuration of a vehicle system including an image processing device according to the present technology.

FIG. 2 is an explanatory view of a high beam and a low beam irradiated from a headlight included in a vehicle.

FIG. 6 is a view illustrating an overview of processing by an image processing device according to the present technology.

FIG. 12 is a table of comparing a composite image generated according to the present technology with related-art technologies.

DESCRIPTION OF EMBODIMENTS

Figure 3A:
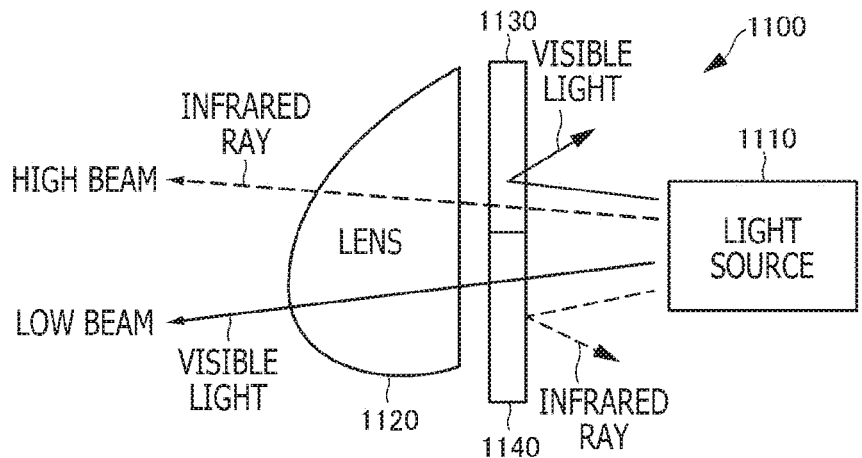
FIGS. 3A, 3B, and 3C depict explanatory views of a system of switching between the high beam and the low beam.

Embodiments of the present technology will be described with reference to drawings. It should be noted that the description will be given in the following order.
<1. Embodiments>
(1-1. Configuration of Vehicle System)
(1-2. Overview of Processing in Image Processing Device)
(1-3. Processing by Image Processing Device)
(1-3-1. First Processing Example)
(1-3-2. Second Processing Example)
<2. Variations>

1. Embodiments 1-1. Configuration of Vehicle System

A configuration of a vehicle system 10 including an image processing device 100 will be described with reference to FIG. 1 and FIG. 2. As illustrated in FIG. 1, the vehicle system 10 includes an image processing device 100, an infrared ray camera 11, a visible light camera 12, a driving controller 13, a display unit 14, and an activation controller 15. The vehicle system 10 is mounted on a vehicle 1000.

The infrared ray camera 11 uses infrared rays irradiated by an infrared ray projector to photograph an infrared ray image in front of the vehicle 1000. The infrared ray image obtained by photographing is supplied to the image processing device 100.

The visible light camera 12 photographs an image of visible lights. A visible light image obtained by photographing is supplied to the image processing device 100. The infrared ray camera 11 and the visible light camera 12 are, for example, provided on an opposite surface of the mirror surface of a room mirror included in the vehicle 1000. However, as long as a front direction of the vehicle 1000 can be photographed, the infrared ray camera 11 and the visible light camera 12 may be provided anywhere inside the vehicle and/or outside the vehicle.

The image processing device 100 performs image processing according to the present technology by using the visible light image and infrared ray image that have been supplied, and generates a composite image. The composite image is supplied to the display unit 14 and the driving controller 13. The image processing device 100 includes, for example, a DSP (Digital Signal Processor) and the like. The configuration and processing of the image processing device 100 will be described later.

The display unit 14 includes display means including, for example, an LCD (Liquid Crystal Display), a PDP (Plasma Display Panel), an organic EL (Electro Luminescence) panel, or the like. The display unit 14 includes a monitor or the like constituting an electronic mirror, a car navigation system, or an on-vehicle audio device provided in the vehicle 1000, and displays the composite image generated by the image processing device 100 to present the composite image to a user.

The driving controller 13 controls driving of the vehicle 1000, on the basis of the composite image generated by the image processing device 100. The driving controller 13 controls driving of the vehicle 1000 as an Advanced driver-assistance system (ADAS). The driving controller 13 include a DSP or the like.

The activation controller 15 controls activation of steering of the vehicle 1000 under the control of the driving controller 13. The driving controller 13 includes a DSP or the like.

The vehicle system 10 configured as described above is mounted on the vehicle 1000.

The vehicle 1000 is a mobile body which is referred to as an automobile or the like and travels on a road by rotating wheels with the power of an engine. The vehicle 1000 includes a headlight 1100 which illuminates the front. As illustrated in FIG. 2, lights with different irradiation distances, referred to as a high beam and a low beam, can be irradiated. The headlight corresponds to an illumination device in the scope of claims. The high beam in a first direction is also referred to as a headlight for traveling, and the irradiation distance thereof is specified to be capable of illuminating 100 meters ahead of the vehicle 1000. In addition, the low beam in a second direction is also referred to as a headlight for passing, and the low beam is specified to be capable of illuminating 40 meters ahead of the vehicle 1000. In this way, the high beam, which is the irradiation in the first direction, has a wider irradiation range than that of the low beam, which is the irradiation in the second direction.

The vehicle 1000, on which the image processing device 100 according to the present technology is mounted, has functions of at least irradiating an infrared ray as the high beam and irradiating a visible light as the low beam. It should be noted that both the visible light and the infrared ray may be irradiated in the direction of the low beam. Since the infrared ray is not visually recognized by the user, the irradiation does not interfere with driving of the vehicle 1000 by the user. Further, the vehicle 1000 irradiates the infrared ray as the high beam, but may have a function of irradiating the visible light as the high beam.

Here, switching between the high beam and the low beam of the headlight 1100 included in the vehicle 1000 will be described with reference to FIGS. 3A, 3B, 3C, 4A, 4B, 4C, 4D, and 4E.

FIG. 3A indicates a first system that is a case where a light source 1110 of the headlight 1100 is capable of irradiating both the infrared ray and the visible light. The light source 1110 is capable of irradiating the infrared ray and the visible light in a first direction as the high beam and in a second direction as the low beam that is directed toward a lower side than the first direction.

In the first system, a visible light cut filter 1130 and an infrared ray cut filter 1140 are provided between the light source 1110 and a lens 1120. The visible light cut filter 1130 is arranged to be capable of cutting the visible light irradiated in the first direction. Out of the infrared ray and the visible light that have been irradiated in the first direction from the light source 1110, by cutting the visible light with the visible light cut filter 1130, only the infrared ray is irradiated in the first direction. As a result, only the infrared ray is irradiated as the high beam, and the visible light is not irradiated. Thus, unnecessary glare is not given to oncoming vehicles.

In addition, the infrared ray cut filter 1140 is arranged to be capable of cutting the infrared ray irradiated in the second direction. Out of the infrared ray and the visible light that have been irradiated in the second direction from the light source 1110, by cutting the infrared ray with the infrared ray cut filter 1140, only the visible light is irradiated in the second direction. As a result, only the visible light can be irradiated as the low beam.

Figure 3B:
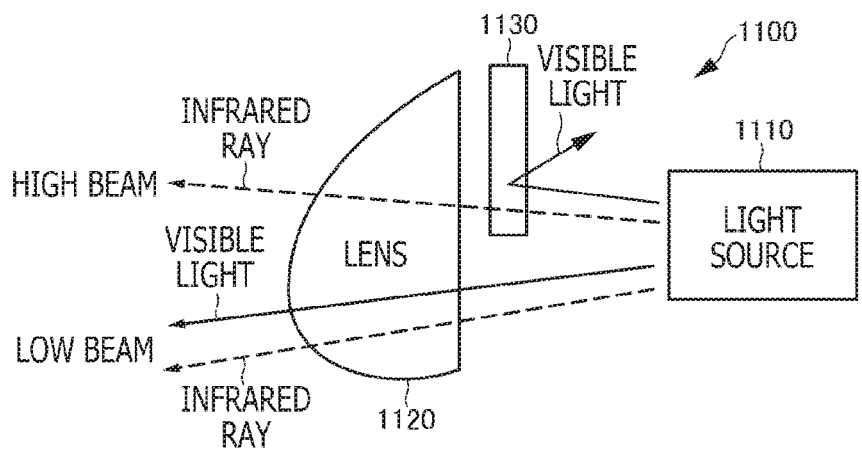

FIG. 3B indicates a second system that is a case where the light source 1110 of the headlight 1100 is capable of irradiating the infrared ray and the visible light in a similar manner to the first system. The light source 1110 is capable of irradiating the infrared ray and the visible light in the first direction as the high beam and in the second direction as the low beam directed toward a lower side than the first direction.

In the second system, only the visible light cut filter 1130 is provided between the light source 1110 and the lens 1120. The visible light cut filter 1130 is arranged to be capable of cutting the visible light irradiated in the first direction. Out of the infrared ray and the visible light that have been irradiated in the first direction from the light source 1110, by cutting the visible light with the visible light cut filter 1130, only the infrared ray is irradiated in the first direction. As a result, only the infrared ray can be irradiated as the high beam.

In the second direction as the low beam, filter cutting is not conducted, and both the infrared ray and the visible light are irradiated. Since the infrared ray cannot be visually recognized by user's eyes, the irradiation as the low beam in the second direction does not interfere with the driving of the vehicle 1000 by the user.

Figure 3C:
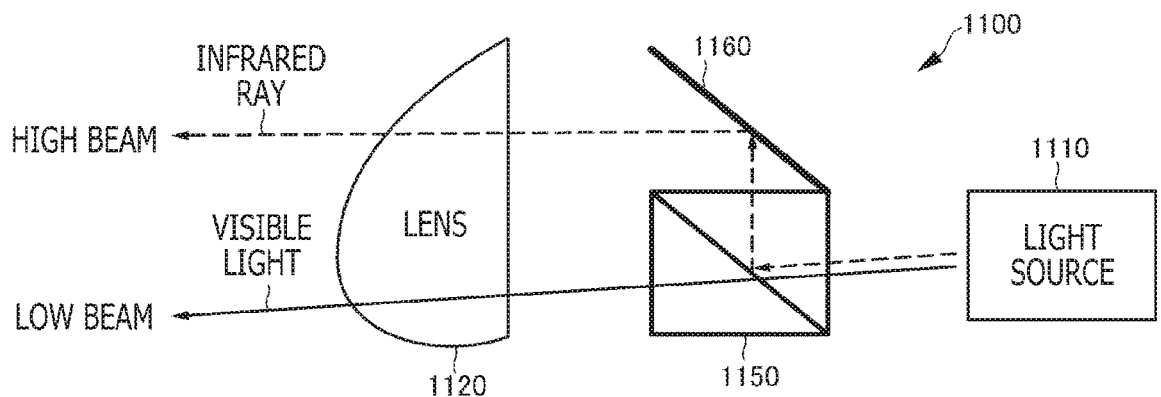

FIG. 3C indicates a third system that is a case where the light source 1110 of the headlight 1100 is capable of irradiating the infrared ray and the visible light in a similar manner to the first system. The light source 1110 is capable of irradiating the infrared ray and the visible light in the first direction that is a direction of the low beam.

In the third system, a beam splitter 1150 and a reflection plate 1160 are provided between the light source 1110 and the lens 1120. The beam splitter 1150 reflects a part of incident light due to the wavelength of the light and causes a part of the light to be transmitted. In the example of FIG. 3C, the beam splitter 1150 causes the visible light to be transmitted and reflects the infrared ray. Since the visible light transmits through the beam splitter 1150 and travels as it is, the visible light is irradiated as the low beam in the second direction.

The reflection plate 1160 is provided in the reflection direction of the infrared ray reflected by the beam splitter 1150. The reflection plate 1160 reflects the infrared ray that has been reflected by the beam splitter 1150, in the first direction which is an irradiation direction of the high beam. Thus, the infrared ray is irradiated as the high beam.

Figure 4A:
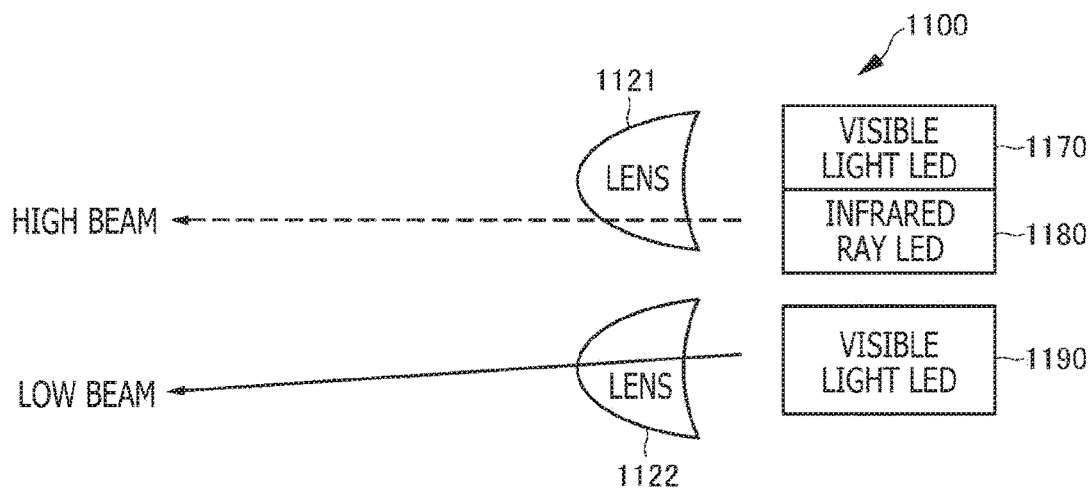
FIGS. 4A, 4B, 4C, 4D, and 4E depict explanatory views of a system of switching between the high beam and the low beam.

In a fourth system, as illustrated in FIG. 4A, a visible light LED 1170 for irradiating the visible light as the high beam in the first direction, an infrared ray LED 1180 for irradiating the infrared ray as the high beam in the first direction, and a visible light LED 1190 capable of irradiating the visible light as the low beam in the second direction are provided as light sources of the headlight 1100. In addition, a first lens 1121, where the infrared ray and the visible light that have been irradiated in the first direction enter, and a second lens 1122, where the visible light that has been irradiated in the second direction enters, are provided.

Figure 4B:
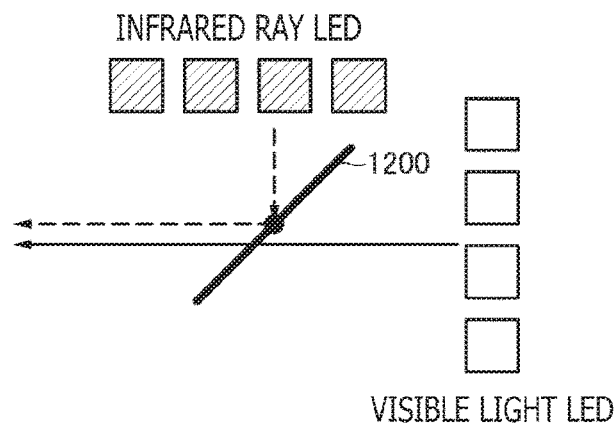
Figure 4C:
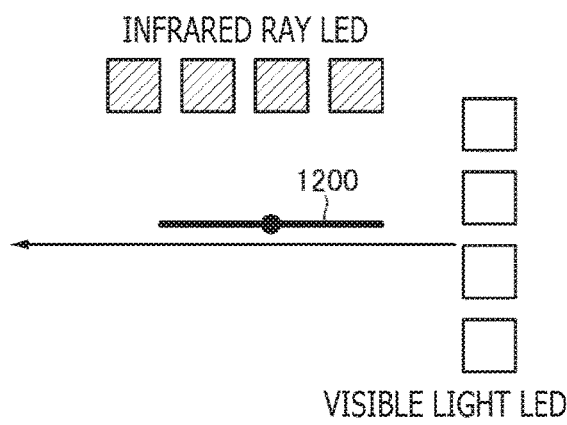

Switching of the irradiation between the visible light LED 1170 and the infrared ray LED 1180 provided for the first direction can be performed by various methods. For example, there is a method that, as illustrated in FIG. 4B, both the infrared ray and the visible light are irradiated in the first direction by deflecting an irradiation direction of the infrared ray with a hot/cold mirror 1200, and as illustrated in FIG. 4C, only the visible light is irradiated in the first direction by operating the hot/cold mirror 1200.

Figure 4D:
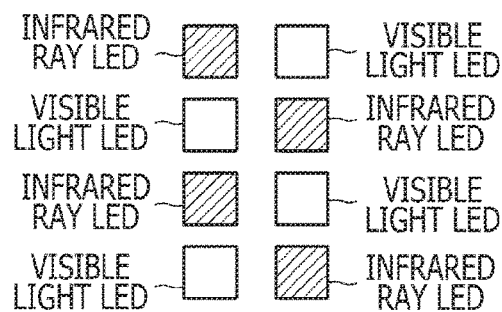
Figure 4E:
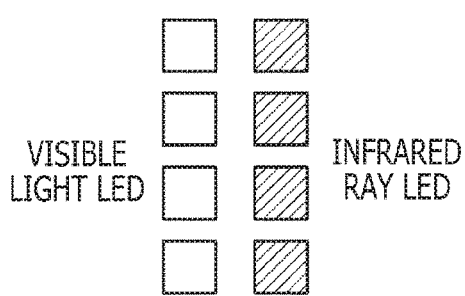
Figure 5B:
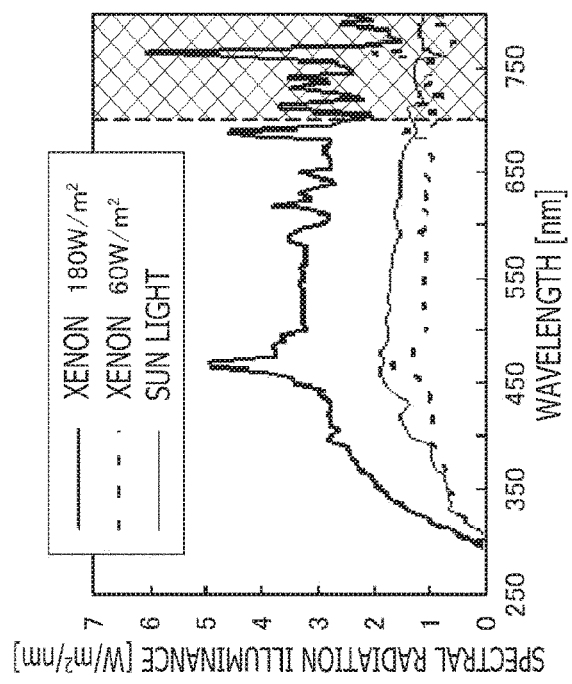
FIGS. 5A, 5B, 5C, and 5D depict explanatory views of a light source of the headlight.
Figure 5D:
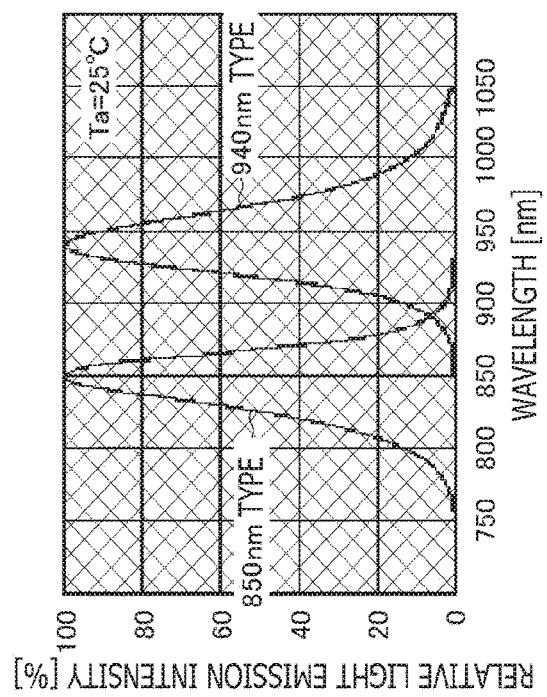
Figure 5A:
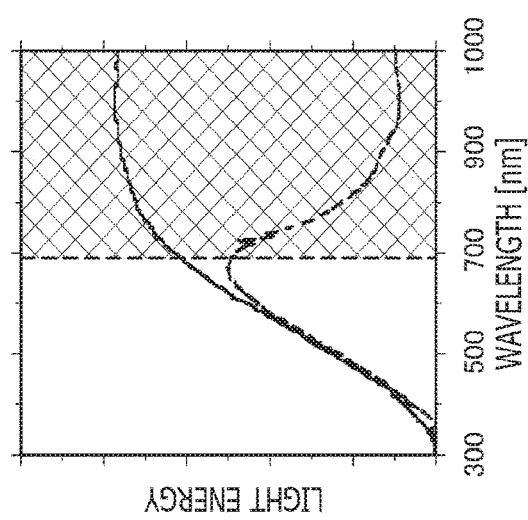
Figure 5C:
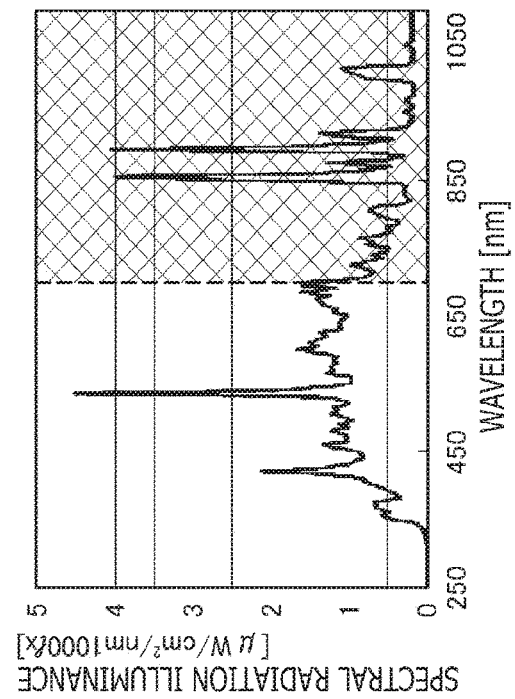

Further, there is another method that, as illustrated in FIG. 4D or 4E, the infrared ray LEDs and the visible light LEDs are arranged, and switching of the irradiation is performed by switching on and off the infrared ray LEDs and the visible light LEDs according to a predetermined control signal.

By configuring the switching between the high beam and the low beam of the headlight 1100 as described above, a headlight having a complicated mechanical configuration is not needed.

It should be noted that a halogen lamp, a xenon lamp, an HID (High Intensity Discharge) lamp, an LED (light emitting diode), or the like can be used as the light source of the headlight 1100. Since any of them is capable of irradiating the infrared ray as indicated by shaded portions in the graphs of FIGS. 5A, 5B, 5C, and 5D, the present technology can be implemented by using any light source. It should be noted that, regarding the HID lamp, the HID lamp capable of efficiently irradiating the visible light and the infrared ray can be achieved by changing a light-emitting additive in the lamp.

1-2. Overview of Processing in Image Processing Device

Next, an overview of image processing in the image processing device 100 will be described with reference to FIGS. 6, 7A, 7B, and 7C. An infrared ray image photographed by the infrared ray camera 11 and a visible light image photographed by the visible light camera 12 are supplied to the image processing device 100.

Figure 7A:
FIGS. 7A, 7B, and 7C depict views illustrating an infrared ray image, a visible light image, and a composite image.
Figure 7B:

FIG. 7A indicates an infrared ray image photographed by the infrared ray camera 11, and FIG. 7B indicates a visible light image photographed by the visible light camera 12. The infrared ray image has a high sensitivity, a high PSNR (Peak signal-to-noise ratio), and less noise. However, it is a black and white or monochrome image, which is generally called. In contrast, the visible light image has a low sensitivity, a low PSNR, and much noise in the image. However, the visible light image is a color image and has colors.

Figure 7C:

Hence, the image processing device 100 synthesizes an infrared ray image and a visible light image to generate a color image with a high sensitivity, a high PSNR, and less noise, as illustrated in FIG. 7C.

The image processing device 100 separates the visible light image into a luminance signal and a color signal, and performs level matching between the luminance signal of the infrared ray image and the luminance signal of the visible light image. By such level adjustment processing, a luminance signal with a high sensitivity and less noise can be obtained. Next, with the luminance signal of the infrared ray image that has been subjected to the level adjustment as guide information, processing is performed to remove noise from the color signal of the visible light image. Then, a composite image is generated by synthesizing the luminance signal of the infrared ray image and the color signal of the visible light image from which the noise has been removed.

The guide information including the luminance signal indicates a boundary to which an identical color is included in the image. The guide information is used to determine an area where the identical color is included by grasping the outline of a substance, on the basis of the luminance.

It should be noted that the image processing device 100, which performs such image processing, includes a program. The program may be installed beforehand in a processor such as a DSP or in a computer that performs signal processing, or may be distributed by downloading or in a storage medium or the like for users to be installed by themselves. In addition, the image processing device 100 may be achieved not only by a program but also by combining a dedicated device including hardware having such functions, a circuit, and the like.

1-3. Processing by Image Processing Device

1-3-1. First Processing Example

A first example of processing in the image processing device 100 will be described. The first processing example is a case where only the infrared ray is irradiated as the high beam in the first direction and only the visible light is irradiated as the low beam in the second direction, by using the above-described first system of switching between the high beam and the low beam.

Figure 8:
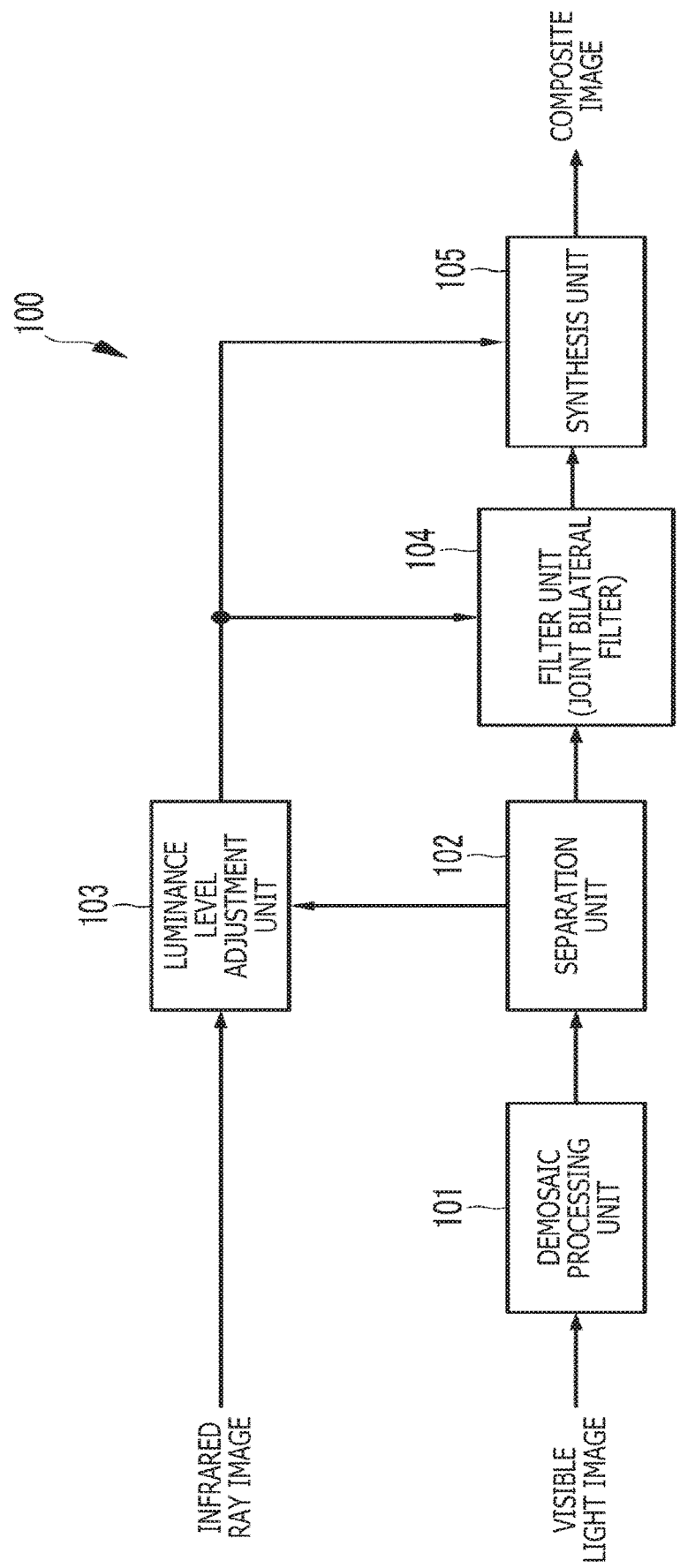
FIG. 8 is a block diagram illustrating a configuration of an image processing device in a first example of image processing.

First, a configuration of the image processing device 100 in the first processing example will be described with reference to FIG. 8. The image processing device 100 includes a demosaic processing unit 101, a separation unit 102, a luminance level adjustment unit 103, a filter unit 104, and a synthesis unit 105. An infrared ray image that has been photographed by the infrared ray camera 11 is supplied to the luminance level adjustment unit 103. In addition, the visible light image that has been photographed by the visible light camera 12 is supplied to the demosaic processing unit 101.

Since a RAW image data, which is a visible light image supplied from the visible light camera 12, has a Bayer arrangement, the demosaic processing unit 101 performs demosaic processing on the visible light image.

The separation unit 102 serves as a conversion processing unit that converts an RGB image data into YCrCb data to separate luminance and color. In the present embodiment, the RGB image data is converted into a luminance signal Y and a color signal YCrCb, and processing is performed in a color-separated state. The separated luminance signal is supplied to the luminance level adjustment unit 103, and the color signal is supplied to the filter unit 104. It should be noted that, as long as a data format is for separating into the luminance and color, another data format such as L*a*b*, YUV, or the like may be used.

The luminance level adjustment unit 103 performs level matching of the luminance signal of the visible light image and the luminance signal of the infrared ray image by a local average value. A luminance signal with a high sensitivity and a high SN ratio generated by the level matching is supplied to the filter unit 104 and the synthesis unit 105.

The filter unit 104 performs filter processing on the color signal through a Joint Bilateral Filter with the supplied luminance signal as guide information to generate a color signal with a high sensitivity and a high SN ratio. The color signal is supplied to the synthesis unit 105.

The synthesis unit 105 synthesizes the luminance signal of the infrared ray image that has been supplied from the luminance level adjustment unit 103 and the color signal that has been supplied from the filter unit 104 to generate an RGB image. It can be said that the synthesis unit 105 performs processing for restoring a luminance signal and a color signal in a separated state to RGB image data.

Figure 9:
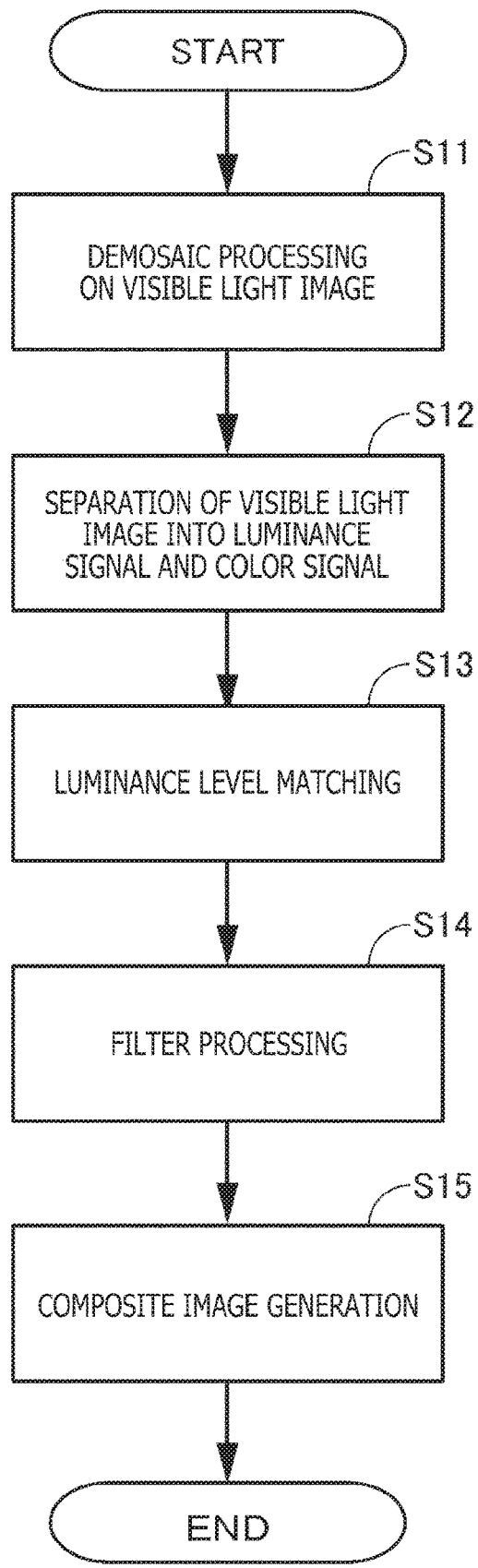
FIG. 9 is a flowchart of the first example of the image processing.

Next, processing in the image processing device 100 will be described with reference to a flowchart of FIG. 9. When an infrared ray image and a visible light image are each input to the image processing device 100, first, in step S11, the demosaic processing unit 101 performs the demosaic processing on the visible light image.

Next, in step S12, the visible light image is separated into a luminance signal and a color signal by the separation unit 102. The separated luminance signal is supplied to the luminance level adjustment unit 103, and the separated color signal is supplied to the filter unit 104. It should be noted that the infrared ray image is also supplied to the luminance level adjustment unit 103.

Then, in step S13, the luminance level adjustment unit 103 performs level matching processing of the luminance signal of the infrared ray image and the luminance signal of the visible light image by using the following Formula 1.

$$y = \frac{\overline{y}}{\overline{IR}} IR(i, j) \qquad \text{[Math. 1]}$$

The luminance signal of the infrared ray image that has been subjected to the level adjustment processing is supplied to the filter unit 104 and the synthesis unit 105.

Next, in step S14, the filter unit 104 performs filter processing on the color signal of the visible light image, by using the following Formula 2 with the luminance signal of the infrared ray image as guide information. As described above, in this first example, the Joint Bilateral Filter is used as a filter. The Joint Bilateral Filter is a filter capable of smoothing other parts while preserving edges, and performs filtering processing using information of two images. The Joint Bilateral Filter is an effective filter in obtaining an image in a better state by using two images including an image with precise colors but much noise and an image with imprecise colors but less noise. The color signal of the visible light image that has been subjected to the filter processing is supplied to the synthesis unit 105.

$$C_{out} = \sum w(i, j) C_{in}(i, j) \qquad \text{[Math. 2]}$$

$$w(i, j) = \sum_{n=-w}^{w} \sum_{m=-w}^{w} \exp\left(-\frac{m^2 + n^2}{2\sigma_1^2}\right) \exp\left(-\frac{(y(i, j) - y(i+m, j+n))^2}{2\sigma_2^2}\right)$$

Then, in step S15, the synthesis unit 105 synthesizes the luminance signal of the infrared ray image and the color signal of the visible light image on a matrix to generate an RGB color composite image.

The first example of the processing by the image processing device 100 is performed as described above.

1-3-2. Second Processing Example

Next, a second example of processing by the image processing device 100 will be described. The second example is a case where an infrared ray and a visible light are irradiated as an adaptive high beam in the first direction and only the visible light is irradiated as the low beam in the second direction by using the above-described fourth system of switching between the high beam and the low beam and an image is obtained by an RGB-IR sensor. An image obtained by the RGB-IR sensor is referred to as an RGB-IR image.

Figure 10:
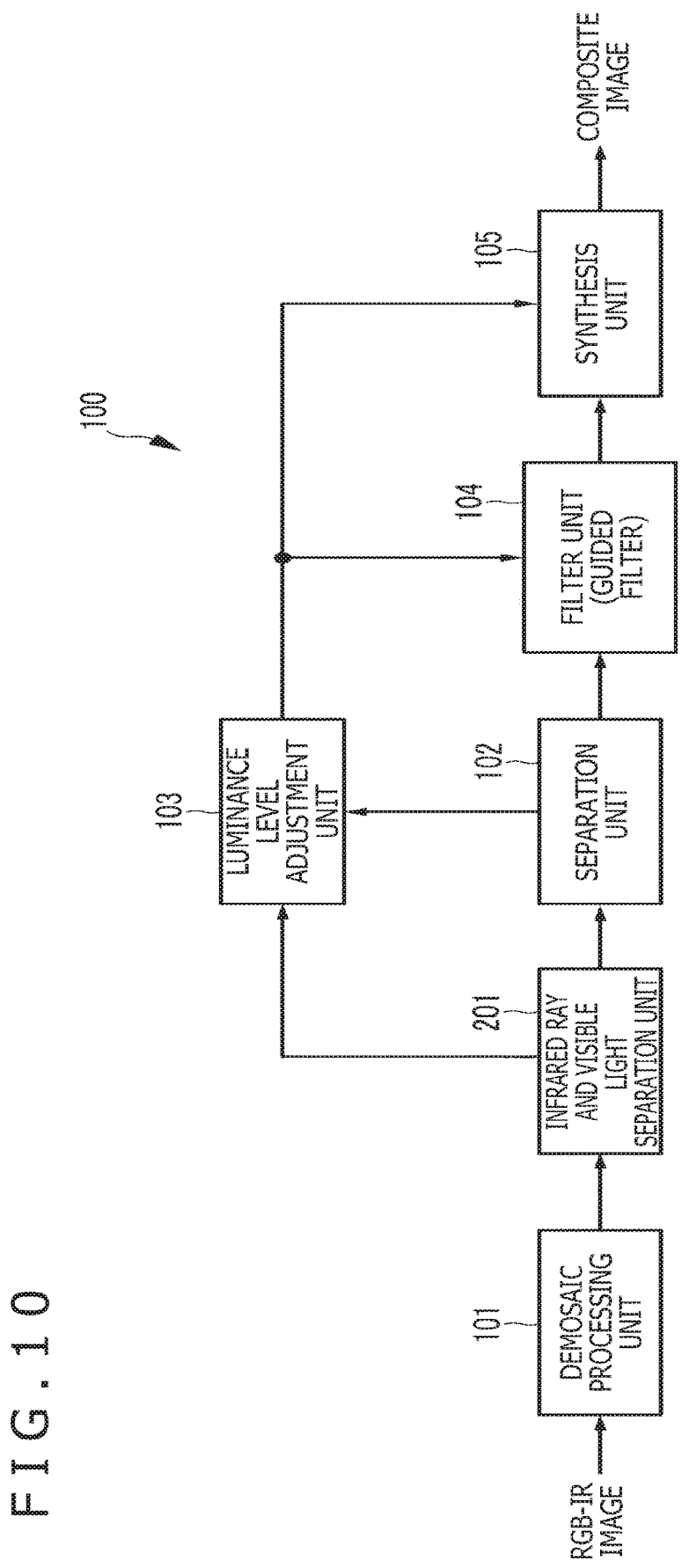
FIG. 10 is a block diagram illustrating a configuration of the image processing device in a second example of the image processing.

First, a configuration of the image processing device 100 in the second processing example will be described with reference to FIG. 10. The image processing device 100 includes a demosaic processing unit 101, an infrared ray and visible light separation unit 201, a separation unit 102, a luminance level adjustment unit 103, a filter unit 104, and a synthesis unit 105. The demosaic processing unit 101, the separation unit 102, the luminance level adjustment unit 103, and the synthesis unit 105 are similar to those in the first processing example, and therefore, the descriptions are omitted.

An RGB-IR image which is an image obtained by the RGB-IR sensor is supplied to the demosaic processing unit 101.

The infrared ray and visible light separation unit 201 separates the supplied RGB-IR image into an infrared ray image and a visible light image. The RGB-IR sensor is capable of simultaneously obtaining both the infrared ray image and the visible light image, as RGB-IR images.

In the second example, the filter unit 104 performs the filtering processing on a color signal through a guided filter with the supplied luminance signal as guide information and generates a color signal with a high sensitivity and a high SN ratio. The color signal is supplied to the synthesis unit 105.

Figure 11:
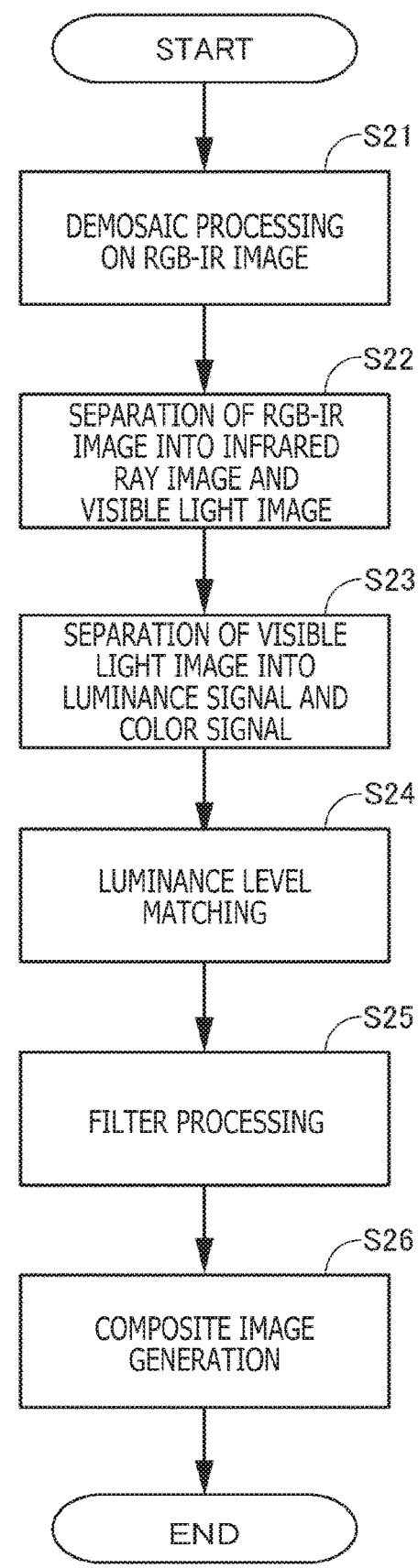
FIG. 11 is a flowchart of the second example of the image processing.

Next, processing in the image processing device 100 will be described with reference to a flowchart of FIG. 11.

When an RGB-IR image is input to the image processing device 100, first, in step S21, the demosaic processing unit 101 performs the demosaic processing on the RGB-IR image.

Next, in step S22, the RGB-IR image is separated into an infrared ray image and a visible light image. The separated infrared ray image is supplied to the luminance level adjustment unit 103, and the separated visible light image is supplied to the separation unit 102.

Next, in step S23, the visible light image is separated into a luminance signal and a color signal by the separation unit 102. The separated luminance signal is supplied to the luminance level adjustment unit 103, and the color signal is supplied to the filter unit 104. It should be noted that the infrared ray image is also supplied to the luminance level adjustment unit 103.

Next, in step S24, the luminance level adjustment unit 103 performs the level matching processing of the luminance signal of the infrared ray image and the luminance signal of the visible light image by using the following Formula 3.

$$y = \frac{\overline{y}}{\overline{IR}} IR(i, j) \qquad \text{[Math. 3]}$$

The luminance signal of the infrared ray image that has been subjected to the level adjustment processing is supplied to the filter unit 104 and the synthesis unit 105.

Next, in step S25, the filter unit 104 performs filter processing on the color signal of the visible light image, by using the following Formula 4 with the luminance signal of the infrared ray image as guide information. In this second processing example, a guided filter is used as a filter. The guided filter is a filter capable of removing noise while preserving edges of an image to be processed with information of an image with less noise as guide information. The color signal of the visible light image that has been subjected to the filter processing is supplied to the synthesis unit 105.

$$a_k = \frac{cov_k(Y, C)}{var_k(Y) + \varepsilon} \qquad \text{[Math. 4]}$$

$$b_k = \overline{C}_k - a\overline{Y}_k$$

$$C_{out} = \frac{1}{|\omega|} \sum_{k|i \in \omega_k} (a_k Y_i + b_i) = \overline{a}_i Y_i + \overline{b}_i$$

Then, in step S26, the luminance signal of the infrared ray image and the color signal of the visible light image are synthesized on a matrix, and an RGB color composite image is generated.

The image synthesis processing in the present technology is performed as described above.

According to the present technology, a color image is obtainable having a wide range, a high sensitivity that is bright, and high visibility that is sharp, as if the visible light is always being irradiated as the high beam even at night. It should be noted that the image with a high sensitivity can be defined as "an image having a higher SN ratio and less noise within an identical photographing time (exposure time)," in a case where an image is defined with a noise amount.

Further, since the color image is obtainable by photographing the wide range corresponding to the irradiation range of the high beam, there is no poor visibility as in the case of a low beam in the past. The situation around the vehicle 1000 can be easily and accurately grasped from the obtained image.

The composite image generated according to the present technology is supplied to the display unit 14 and is displayed on a monitor or the like constituting, for example, an electronic mirror, a car navigation system, or an on-vehicle audio device of the vehicle 1000. This enables a user to grasp the situation in front of the vehicle 1000 with a sharp color image with less noise.

Further, the composite image is supplied to the driving controller 13, so that an oncoming vehicle, a preceding vehicle, an obstacle, a pedestrian, and the like can be detected by image analysis to be used for the advanced driving support system (ADAS). For example, the analysis result of the composite image may be reflected on automatic driving, or may be informed to the user by an alert when an obstacle or the like is detected by the image analysis. Further, when an obstacle or the like is detected by the image analysis, a high beam of a visible light can be automatically irradiated from the headlight to prompt a user to visually confirm the obstacle and the like.

FIG. 12 is a table of comparing features of the present technology with other known technologies. As indicated in the table, in the present technology, a color image in a range substantially equal to the irradiation range of the high beam is obtainable. Hence, visibility in the vicinity of the vehicle, visibility of a distant place of the vehicle, and visibility in the periphery of the vehicle are superior to the low beam and the adaptive headlight, and are superior similar to a near infrared ray image.

In addition, in the present technology, since a color image is obtainable, it can be said that in this point, such a color image is superior to any of the low beam, the adaptive headlight, and the near infrared ray image.

Furthermore, in the present technology, since a color image is obtainable, it can be said that the present technology is superior to other technologies also in the usefulness in application to a display in an electronic mirror or the like and the ADAS.

2. Variations

Heretofore, while the embodiments of the present technology have been described in detail, the present technology is not limited to the above-described embodiments, and various variations based on a technical concept of the present technology are available.

Figure 13:
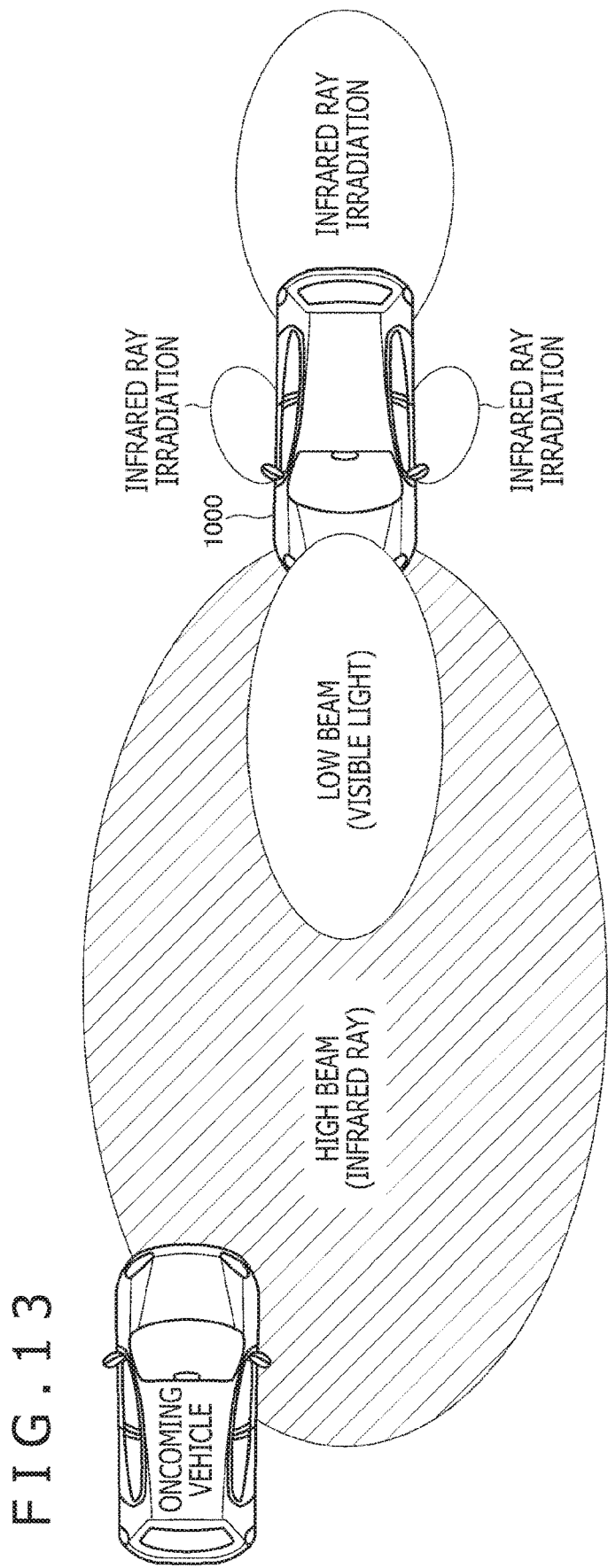
FIG. 13 is a view illustrating a configuration of a vehicle according to a variation.

As illustrated in FIG. 2, in the above-described embodiment, the description has been given that the image processing is performed by irradiating the visible light and the infrared ray in the front direction of the vehicle 1000. However, the present technology can be used also in a rear direction and/or a side direction of the vehicle 1000. In a case where the present technology is applied in the rear direction and/or the side direction of the vehicle 1000, it is necessary to photograph an infrared ray image and a visible light image also in the rear direction and/or the side direction. However, regarding the visible light image, light such as a natural light or streetlight may be used for photographing, and as illustrated in FIG. 13, only the infrared ray may be irradiated in the rear direction and/or the side direction.

The vehicle 1000 has been described as a mobile body in the embodiments, but the mobile body to which the present technology is applicable is not limited to the vehicle 1000. The present technology is applicable to any type of body that moves, such as a motorcycle, an aircraft, a drone, a ship, and the like.

The present technology can also take the following configurations.

(1)
An image processing device
to which a visible light image and an infrared ray image are input, the visible light image having been obtained corresponding to irradiation of a visible light in a second direction, the infrared ray image having been obtained corresponding to irradiation of an infrared ray in a first direction, which is a direction having an irradiation range larger than an irradiation range of the second direction, and
which synthesizes the infrared ray image and the visible light image to generate a color image.

(2)
The image processing device described in (1), in which the first direction includes an irradiation direction of a high beam in a vehicle.

(3)
The image processing device described in (1) or (2), in which
the second direction includes an irradiation direction of a low beam in a vehicle.

(4)
The image processing device described in any one of (1) to (3), in which
filter processing is performed on the visible light image with a luminance signal of the infrared ray image as guide information to generate the color image.

(5)
The image processing device described in (4), in which the luminance signal of the infrared ray image is subjected to level adjustment using a luminance signal of the visible light image.

(6)
The image processing device described in (4) or (5), in which
the visible light image is separated into a visible light luminance signal and a visible light color signal,
an infrared ray luminance signal of the infrared ray image is subjected to level adjustment using the visible light luminance signal,
the filter processing is performed on the visible light color signal, and
the visible light color signal and the infrared ray luminance signal are synthesized to generate the color image.

(7)
An image processing method including:
receiving inputs of a visible light image and an infrared ray image, the visible light image having been obtained corresponding to irradiation of a visible light in a second direction, the infrared ray image having been obtained corresponding to irradiation of an infrared ray in a first direction, which is a direction having an irradiation range larger than an irradiation range of the second direction; and
synthesizing the infrared ray image and the visible light image to generate a color image.

(8)
An image processing program for causing a computer to perform an image processing method including:
receiving inputs of a visible light image and an infrared ray image, the visible light image having been obtained corresponding to irradiation of a visible light in a second direction, the infrared ray image having been obtained corresponding to irradiation of an infrared ray in a first direction, which is a direction having an irradiation range larger than an irradiation range of the second direction; and
synthesizing the infrared ray image and the visible light image to generate a color image.

(9)
A mobile body including:
an image processing device
to which a visible light image and an infrared ray image are input, the visible light image having been obtained corresponding to irradiation of a visible light in a second direction, the infrared ray image having been obtained corresponding to irradiation of an infrared ray in a first direction, which is a direction having an irradiation range larger than an irradiation range of the second direction, and
which synthesizes the infrared ray image and the visible light image to generate a color image; and
an illumination device that irradiates an infrared ray in the first direction and that irradiates a visible light in the second direction.

REFERENCE SINGS LIST

100 Image processing device
1000 Vehicle

The invention claimed is:
1. An image processing device, comprising:
a central processing unit (CPU) configured to:
receive a visible light image and an infrared ray image, wherein
the infrared ray image corresponds to irradiation of an infrared ray in a first direction, the visible light image corresponds to irradiation of a visible light in a second direction, and the first direction has an irradiation range larger than the second direction;

separate the visible light image into a visible light luminance signal and a visible light color signal;

perform level adjustment of an infrared ray luminance signal of the infrared ray image based on the visible light luminance signal of the visible light image;

perform a filter process on the visible light color signal based on the infrared ray luminance signal, wherein noise of the visible light color signal is adjusted based on the filter process; and synthesize the visible light color signal and the infrared ray luminance signal to generate a color image.

2. The image processing device according to claim 1, wherein the first direction includes an irradiation direction of a high beam in a vehicle.

3. The image processing device according to claim 1, wherein the second direction includes an irradiation direction of a low beam in a vehicle.

4. The image processing device according to claim 1, wherein the infrared ray luminance signal of the infrared ray image is utilized as guide information to generate the color image.

5. An image processing method, comprising:

in an image processing device:

receiving a visible light image and an infrared ray image, wherein the infrared ray image corresponds to irradiation of an infrared ray in a first direction, the visible light image corresponds to irradiation of a visible light in a second direction, and the first direction has an irradiation range larger than the second direction;

separating the visible light image into a visible light luminance signal and a visible light color signal;

performing level adjustment of an infrared ray luminance signal of the infrared ray image based on the visible light luminance signal of the visible light image;

performing a filter process on the visible light color signal based on the infrared ray luminance signal, wherein noise of the visible light color signal is adjusted based on the filter process; and synthesizing the visible light color signal and the infrared ray luminance signal to generate a color image.

6. A non-transitory computer-readable medium having stored thereon computer-executable instructions which, when executed by a computer, cause the computer to execute operations, the operations comprising:

receiving a visible light image and an infrared ray image, wherein the infrared ray image corresponds to irradiation of an infrared ray in a first direction, the visible light image corresponds to irradiation of a visible light in a second direction, and the first direction has an irradiation range larger than the second direction;

separating the visible light image into a visible light luminance signal and a visible light color signal;

performing level adjustment of an infrared ray luminance signal of the infrared ray image based on the visible light luminance signal of the visible light image;

performing a filter process on the visible light color signal based on the infrared ray luminance signal, wherein noise of the visible light color signal is adjusted based on the filter process; and synthesizing the visible light color signal and the infrared ray luminance signal to generate a color image.

7. A mobile body, comprising:

an image processing device that comprises:

a central processing unit (CPU) configured to:

receive a visible light image and an infrared ray image, wherein the infrared ray image corresponds to irradiation of an infrared ray in a first direction, the visible light image corresponds to irradiation of a visible light in a second direction, and the first direction has an irradiation range larger the second direction;

separate the visible light image into a visible light luminance signal and a visible light color signal;

perform level adjustment of an infrared ray luminance signal of the infrared ray image based on the visible light luminance signal of the visible light image;

perform a filter process on the visible light color signal based on the infrared ray luminance signal, wherein noise of the visible light color signal is adjusted based on the filter process; and synthesize the visible light color signal and the infrared ray luminance signal to generate a color image; and an illumination device configured to irradiate the infrared ray in the first direction and the visible light in the second direction.

\* \* \* \* \*